Oct. 14, 1969  L. A. HERÉDY  3,472,745
FUSIBLE ALKALI-METAL SALT ELECTROLYTE
Filed March 8, 1967
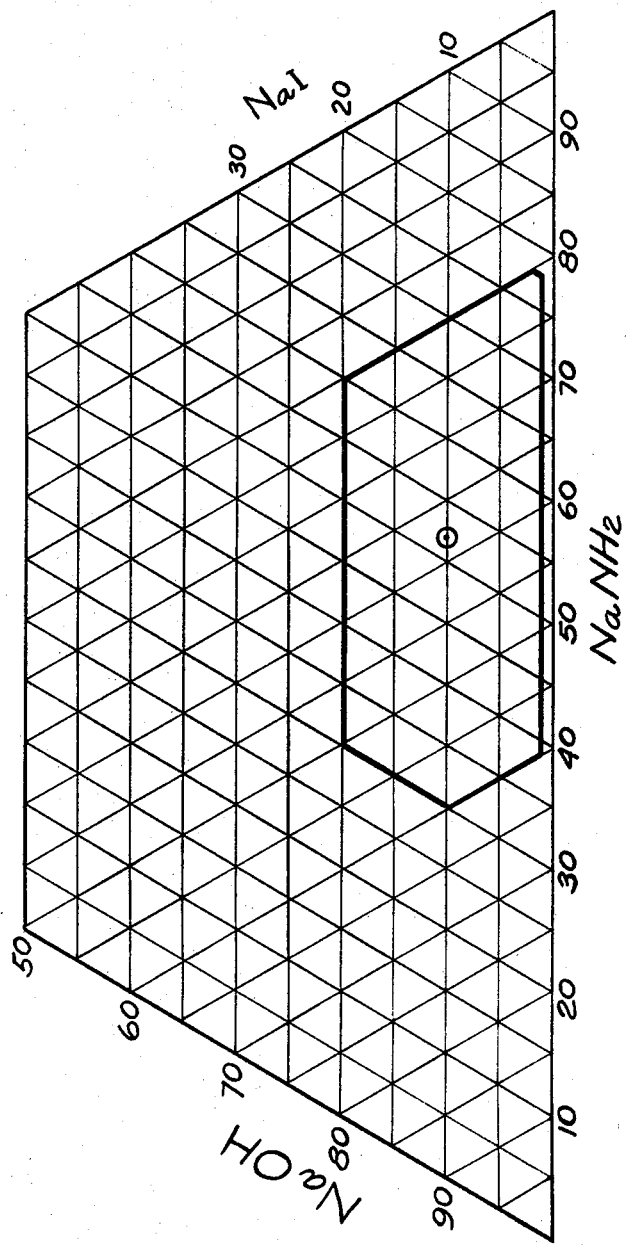
INVENTOR.
LASZLO A. HERÉDY
BY Henry Kolin
ATTORNEY United States Patent Office 3,472,745
Patented Oct. 14, 1969

3,472,745
FUSIBLE ALKALI-METAL SALT ELECTROLYTE
Laszlo A. Herédy, Canoga Park, Calif., assignor to North American Rockwell Corporation, a corporation of Delaware
Filed Mar. 8, 1967, Ser. No. 621,577
Int. Cl. C22d 3/06; H01m 43/06
U.S. Cl. 204—68                 11 Claims

ABSTRACT OF THE DISCLOSURE

A multicomponent mixed salt electrolyte, molten below 180° C., containing sodium amide or potassium amide as essential component. Preferred ternary and quaternary mixed salts consist essentially of alkali metal amide, alkali metal hydroxide, and at least one additional alkali-metal salt, the alkali metal being selected from sodium and potassium. A preferred fusible sodium salt electrolyte is the ternary mixed salt having a composition, in mole percent, of 30–78 sodium amide, 20–60 sodium hydroxide, and 1–20 sodium iodide.

Cross references to related applications

The alkali-metal salt electrolyte of this invention is utilized particularly in conjunction with the inventions described in "Alkali Metal-Air High Energy-Density Fuel Cell," (5A139), and in "Electrolytic System for Production of Alkali Metals," (5A86), both filed of even date herewith and assigned to the assignee of the present invention. Reference should be made to these applications for fuller details of the utilization of the alkali-metal salt electrolyte in the manner described therein.

Background of the invention

This invention relates to novel fusible sodium and potassium salt systems which are molten at a temperature below 180° C. It particularly relates to an electrolytic bath containing a low-melting alkali-metal salt composition having a high electrical conductivity in the molten state.

Because of their favorable thermodynamic and physical properties, alkali metals are of interest for use in high-energy lightweight batteries. When an alkali metal, such as sodium, is used as an anode material in an electric cell, the electrolyte present must be nonaqueous because of the vigorous chemical reaction that occurs between an alkali metal and water. Solutions of alkali-metal salts in ammonia and in various organic solvents have been proposed as electrolyte, e.g., sodium iodide in ethylamine, sodium fluoborate in dimethyl sulfoxide. However, such electrolytes generaly show a relatively poor conductivity, present concentration polarization problems, and are frequently reactive with the molten alkali. In U.S. Patent 2,315,830, for example, a solution of potassium amide in liquid ammonia is shown as an electrolyte in the production of potassium. In this system, potassium amide is formed as an undesired by-product because of the reaction of the formed potassium with the liquid ammonia accompanied by evolution of hydrogen.

Molten salt mixtures have also been proposed as the nonaqueous electrolyte in an alkali-metal system. In U.S. 3,057,946, a molten mixture consisting of 76% sodium hydroxide, 14% sodium iodide, and 10% sodium bromide is suggested for use as an electrolyte in a fuel cell for operation at a temperature of 230° C. The ternary eutectic of these three components, consisting of 53% sodium hydroxide, 28% sodium iodide, and 19% sodium bromide, is shown in German Patent 862,519 for use as an electrolyte for operation at 230° C. in the electrolytic production of sodium metal from sodium amalgam. In U.S. Patent 3,265,490 a mixed salt consisting of sodium hydroxide, sodium iodide, and sodium cyanide is shown as an electrolytic bath for the production of sodium metal from a sodium amalgam at operating temperatures as low as 210° C.

All of the foregoing molten salt compositions used as electrolytes in conjunction with a molten sodium anode or for the production of sodium from sodium amalgam have temperatures of fusion above 200° C. Such molten salt electrolytes cannot ordinarily be used in isothermal relation with an aqueous electrolyte because of the very high vapor pressure of water and its great reactivity with amalgam at the operating temperature of these molten electrolytes. Consequently, as may be noted in U.S. 3,057,946, elaborate heat exchangers and associated conduits and pumping equipment are required. Further, the vapor pressure of mercury is significant above 200° C. Operation above this temperature results in substantial losses of mercury by evaporation as well as contamination of the sodium by dissolved mercury.

Summary of the invention

It is an object of this invention to provide a novel mixture of fusible alkali-metal salts, the alkali metal being selected from sodium and potassium, melting below 180° C., which is particularly suitable for use as molten electrolyte in electrochemical systems using alkali metal and alkali metal-amalgam electrodes. The low-melting molten salt electrolyte provided by this invention is chemically stable at temperatures below 180° C. in contact with alkali metal or alkali metal amalgam and can be used in a high-energy electric cell in isothermal relation with an aqueous electrolyte. Also, this mixed salt may be used as the molten electrolyte in an electrolysis cell for the production of sodium and potassium from their amalgams; the resultant product is of high quality and markedly free of mercury contamination.

In accordance with the broad aspects of this invention, the novel alkali-metal salt mixture is fusible at a temperature below 180° C. and is an alkali-metal salt system that contains alkali metal amide as essential component, the alkali metal being selected from sodium and potassium. At least binary, ternary, and quaternary component systems may be utilized. Certain binary sodium salt mixtures containing sodium amide may be prepared that are molten below 180° C. However, to prepare a sodium salt mixture that is molten below 160° C. or a potassium salt mixture that is molten below 180° C., the alkali metal must contain alkali metal amide and alkali metal hydroxide as essential components and at least one additional alkali-metal salt as a component of the mixture. A ternary system is generally preferred. The one or more additional components of the sodium or potassium salt mixture are preferably selected from the following inorganic sodium or potassium salts: fluoride, chloride, bromide, iodide, cyanide, and carbonate. The relative proportions of the components may be varied provided the resultant mixture is molten at a temperature below 180° C. for the potassium salt system and below 160° C. for the sodium salt system, a mixture having the lowest melting point being generally preferable.

In its preferred aspects, the alkali metal is sodium, and the sodium salt mixture is molten at a temperature below 160° C. A sodium salt mixture having the lowest melting point is generally preferred.

Brief description of the drawing

The sole figure of the drawing utilizes a triangular coordinate scale to show preferred proportions of a preferred ternary sodium salt system utilized as electrolyte, NaNH₂—NaOH—NaI.

Description of the preferred embodiments

At least three alkali-metal salt components preferably are present in the fusible salt mixture molten below 180° C., it being an essential feature of this invention that at least one of these components is alkali metal amide. The invention will now be particularly described with respect to its preferred embodiments of fusible sodium salt mixtures molten below 160° C., although the binary sodium salt system containing 35 to 40 mole percent sodium hydroxide and the balance sodium amide and having a minimal melting point of about 161° C. is also utilizable as molten electrolyte. Any sodium salt that is chemically compatible with sodium and sodium amalgam at temperatures below 160° C. can be used as the additional electrolyte component to form a ternary mixture with sodium amide and sodium hydroxide. Because of their ready availability, it is preferred that the one or more additional components of the sodium salt mixture containing sodium amide and sodium hydroxide be selected from the following inorganic salts: fluoride, chloride, bromide, iodide, cyanide, and carbonate of sodium.

It is generally preferred for obtaining mixtures of low melting point that the sodium salt mixture contain, in mole percent, from 40 to 60 sodium amide, 30 to 50 sodium hydroxide, and 5 to 15 of at least one additional sodium salt component, although these proportions may be varied beyond the preferred ones set forth provided the melting point of the resultant sodium salt mixture is below 160° C. Preferred ternary sodium salt mixtures consist of NaNH₂—NaOH—NaI and NaNH₂—NaOH—NaCN Preferred quaternary sodium salt mixtures consists of NaNH₂—NaOH—NaI—NaX where NaX is Na₂CO₃, NaCN, NaCl, or NaBr.

In the drawing is illustrated the composition range for a preferred ternary composition of this invention, NaNH₂—NaOH—NaI The enclosed area in the composition diagram corresponds to a sodium salt mixture consisting of, in mole percent (m/o), 30 to 78 sodium amide, 20 to 60 sodium hydroxide, and 1 to 20 sodium iodide. The circled composition in the phase diagram is a particularly preferred embodiment of this invention and consists of a composition of 52 m/o NaNH₂-38 m/o NaOH-10 m/o NaI, each component being expressed to a precision of about ±2 mole percent. This appears to be a eutectic composition and has a melting point of about 127° C. and an electrical conductivity at 130° C. of 0.28 (ohm-cm.⁻¹). A preferred quaternary composition consisting of 52 m/o NaNH₂-38 m/o NaOH-5 m/o NaI-5 m/o Na₂CO₃ has a melting point of about 126° C.

In a thermal analysis of different sodium salt binary systems where one component was sodium amide (M.P. 210° C.), the following compositions were fusible below 180° C.: NaNH₂-6 m/o NaI, NaNH₂-20 m/o NaCN, NaNH₂-20–55 m/o NaOH. The lowest melting temperature observed for a binary system, 161° C., was obtained where the other component was sodium hydroxide (M.P. 318° C.) (35–40 m/o NaOH). Somewhat surprisingly, the addition of a relatively small amount of sodium iodide (M.P. 651° C.) to the NaNH₂-NaOH mixture then resulted in a further marked lowering of the melting point to a minimal value of 127° C. It was found in preparing the preferred molten sodium salt compositions of this invention, that both sodium amide and sodium hydroxide must be present as two of the components in order to have ternary or higher multicomponent mixed salt compositions whose melting point is below 160° C. Such a proposed ternary composition was utilized as molten electrolyte in a static electric cell of the type Na/NaNH₂-NaOH-NaI/NaHg which was operated successfully for 840 hours at temperatures between 127 and 150° C. During this period the cell was charged and discharged at current densities up to 0.5 amp./sq. cm.

Using thermal analysis, the following ternary potassium salt compositions were observed to be molten below 180° C., where the potassium salt mixture contained, in mole percent (m/o), 30 to 50 potassium amide, 20 to 35 potassium hydroxide, and 30 to 50 potassium iodide. A particularly preferred potassium salt mixture contained 36±2 m/o KNH₂, 27±m/o KOH, and 37±2 m/o KI and had a melting point of 171° C.

The fusible sodium and potassium salt mixtures are prepared by mixing the salts, in powder, granule or pellet form, in the desired weight ratios and heating them in an inert atmosphere in alumina or nickel tubes until a molten solution is present. After melting, the salts are miscible in all proportions to form a homogeneous solution. Melting points of the salt mixtures were determined by thermal analysis.

While the principle of the present invention and preferred embodiments of the composition of matter thereof have been illustrated and described, it should be understood that within the scope of the appended claims the invention may be practiced otherwise than as specifically illustrated and described.

I claim:
1. A low-melting molten salt electrolyte for an alkali-metal electrochemical system comprising a fusible alkali-metal salt mixture molten below 180° C., the alkali metal being selected from sodium and potassium, said mixture containing the amide of said alkali metal as essential component.

2. A fusible mixture according to claim 1, said mixture consisting of a binary sodium salt system containing sodium amide and an additional sodium salt component selected from the hydroxide, iodide, and cyanide of sodium.

3. A fusible mixture according to claim 2 containing, in mole percent, 45–80 sodium amide and 20–55 sodium hydroxide.

4. A fusible mixture according to claim 1, said mixture containing alkali metal amide, alkali metal hydroxide, and at least one additional alkali-metal salt.

5. A fusible mixture according to claim 4 which is molten below 160° C., said mixture containing sodium amide, sodium hydroxide, and at least one additional sodium salt.

6. A fusible mixture according to claim 5 containing, in mole percent, 40–60 sodium amide, 30–50 sodium hydroxide, and 5–15 of at least one additional sodium salt.

7. A fusible mixture according to claim 6 wherein said additional sodium salt component includes at least one of the fluoride, bromide, chloride, iodide, cyanide, and carbonate of sodium.

8. A fusible mixture according to claim 5 consisting of the ternary salt system containing, in mole percent, 30–78 sodium amide, 20–60 sodium hydroxide, and 1–20 sodium iodide.

9. A fusible mixture according to claim 8 containing, in mole percent, 52±2 sodium amide, 38±2 sodium hydroxide, and 10±2 sodium iodide.

10. A fusible mixture according to claim 4, said mixture consisting of the ternary potassium salt system containing, in mole precent, 30–50 potassium amide, 20–35 potassium hydroxide, and 30–50 potassium iodide.

11. A fusible mixture according to claim 10, containing, in mole percent, 36±2 potassium amide, 27±2 potassium hydroxide, and 37±2 potassium iodide.

References Cited

UNITED STATES PATENTS

| | | | |
|---|---|---|---|
| 2,075,150 | 3/1937 | Wait | 204—68 XR |
| 2,148,404 | 2/1939 | Gilbert | 204—68 |
| 2,150,289 | 3/1939 | Moltkehansen | 204—68 |
| 3,117,032 | 1/1964 | Panzer | 136—155 XR |

JOHN H. MACK, Primary Examiner

D. R. VALENTINE, Assistant Examiner

U.S. Cl. X.R.

136—155; 204—63

Disclaimer 3,472,745.—*Laszlo A. Herédy*, Canoga Park, Calif. FUSIBLE ALKALI-METAL SALT ELECTROLYTE. Patent dated Oct. 14, 1969. Disclaimer filed Nov. 2, 1970, by the assignee, *North American Rockwell Corporation*.

Hereby enters this disclaimer to claims 1, 2, 3, 4, 5 and 8 of said patent.
[*Official Gazette March 2, 1971.*]